United States Patent
Rustomji et al.

(10) Patent No.: US 11,984,614 B2
(45) Date of Patent: May 14, 2024

(54) CAP FOR ELECTROCHEMICAL CELL

(71) Applicant: SOUTH 8 TECHNOLOGIES, INC., San Diego, CA (US)

(72) Inventors: Cyrus S. Rustomji, San Diego, CA (US); Kadir Toksoy, San Diego, CA (US); Andrea Biondi, San Diego, CA (US); Denton Iverson, La Mesa, CA (US); Maciej Lisiak, San Clemente, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/104,567

(22) Filed: Feb. 1, 2023

(65) Prior Publication Data
US 2023/0246286 A1     Aug. 3, 2023

Related U.S. Application Data

(63) Continuation of application No. PCT/US2023/011864, filed on Jan. 30, 2023.
(Continued)

(51) Int. Cl.
*H01M 50/333*     (2021.01)
*H01G 11/60*     (2013.01)
(Continued)

(52) U.S. Cl.
CPC .......... *H01M 50/333* (2021.01); *H01G 11/60* (2013.01); *H01G 11/80* (2013.01);
(Continued)

(58) Field of Classification Search
CPC ............. H01M 50/375; H01M 10/422; H01M 10/123; H01M 10/283; H01M 50/107; H01M 50/152; H01M 50/153; H01M 50/154; H01M 50/179; H01M 50/30; H01M 50/308; H01M 50/317; H01M 50/325; H01M 50/333; H01M 50/342;
(Continued)

(56) References Cited

U.S. PATENT DOCUMENTS

2020/0067032 A1*   2/2020   Davies ................ H01M 50/184
2021/0057684 A1*   2/2021   Okutani ............. H01M 50/147

FOREIGN PATENT DOCUMENTS

JP     2004-134632    *   4/2004  ............... H01G 9/12

OTHER PUBLICATIONS

Collins Online Dictionary entry for "notch," accessed at https://www.collinsdictionary.com/jp/dictionary/english/notch on Jun. 2, 2023 (Year: 2023).*

* cited by examiner

*Primary Examiner* — Amanda J Barrow
(74) *Attorney, Agent, or Firm* — Manuel de La Cerra

(57) ABSTRACT

A cap assembly is disclosed that creates a gas-tight seal with a cell can housing. The cap assembly has an outer surface, an inner surface and a perimeter edge. The cap assembly further includes an electrolyte injection port forming a port opening between the outer surface and the inner surface, a vent constructed to form a vent opening from the inner surface to the outer surface when a vent pressure differential is achieved between an outer surface pressure and an inner surface pressure. The vent is positioned (a) concentric to the electrolyte injection port, and (b) closer to the perimeter edge than the position of the electrolyte injection port.

25 Claims, 11 Drawing Sheets

Related U.S. Application Data

(60) Provisional application No. 63/306,393, filed on Feb. 3, 2022.

(51) Int. Cl.
*H01G 11/80* (2013.01)
*H01G 11/84* (2013.01)
*H01M 10/0569* (2010.01)
*H01M 10/058* (2010.01)
*H01M 50/152* (2021.01)
*H01M 50/169* (2021.01)
*H01M 50/186* (2021.01)
*H01M 50/645* (2021.01)

(52) U.S. Cl.
CPC ........ *H01G 11/84* (2013.01); *H01M 10/0569* (2013.01); *H01M 10/058* (2013.01); *H01M 50/152* (2021.01); *H01M 50/169* (2021.01); *H01M 50/186* (2021.01); *H01M 50/645* (2021.01); *H01M 2300/0034* (2013.01)

(58) Field of Classification Search
CPC ............. H01M 50/3425; H01M 50/35; H01M 50/358; H01M 50/367
See application file for complete search history.

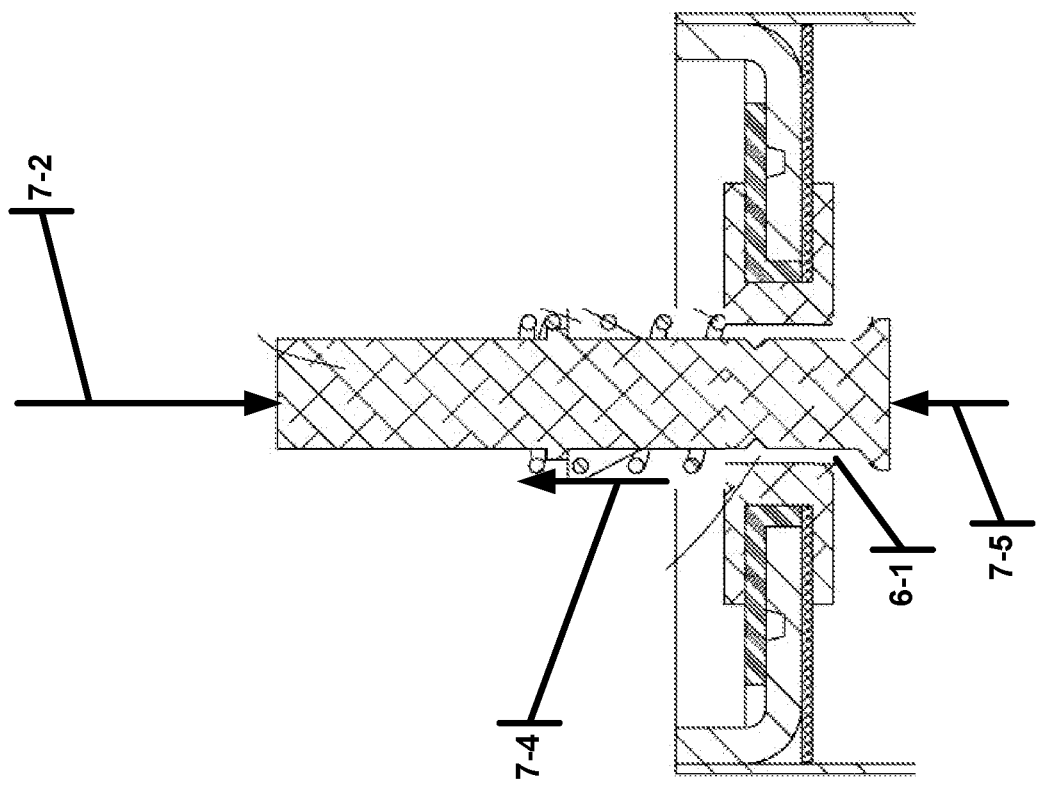
FIG. 4B (Open Configuration)
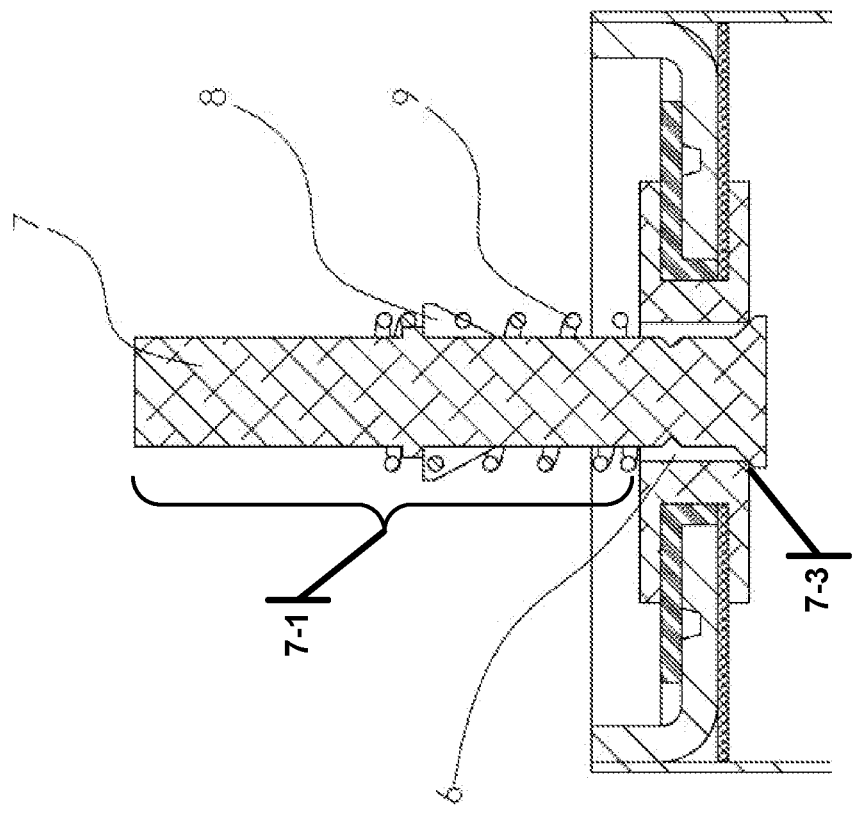
FIG. 4A (Sealed Configuration)

(Sealed Configuration)

(Open Configuration)

(Permanent Sealed
Configuration)

(Sealed Configuration)

(Open Configuration)

(Closed Configuration)

(Open Configuration)

CAP FOR ELECTROCHEMICAL CELL

1.0 CROSS-REFERENCE TO RELATED APPLICATIONS

This application is also related to the applications filed below and the contents of each of these applications are hereby incorporated by reference in their entirety: PCT/US20/048660 filed on Aug. 30, 2020; PCT/US20/020547 filed on Feb. 29, 2020; PCT/US20/048661 filed on Aug. 30, 2020; PCT/US19/032413 filed on May 15, 2019; PCT/US19/032414 filed on May 15, 2019; PCT/US14/066015 filed on Nov. 17, 2014; PCT/US20/026086 filed on Apr. 1, 2020; PCT/US17/029821 filed on Apr. 27, 2017; PCT/US22/031594 filed on May 31, 2022; Provisional Application 63/328,480 filed on Jul. 7, 2022; Provisional Application 63/391,224 filed on Jul. 21, 2022; Provisional Application 63/391,220 filed on Jul. 21, 2022; Provisional Application 63/418,703 filed on Oct. 24, 2022; and Provisional Application 63/418,704 filed on Oct. 24, 2022.

This application claims priority as a continuation of PCT/US23/11864 filed on Jan. 30, 2023, and also claim priority to U.S. Provisional Application 63/306,393 filed on Feb. 3, 2022. The contents of both of these applications are incorporated by reference.

2.0 FIELD OF THE INVENTION

Embodiments of the invention relate to electrochemical cells, such as batteries and capacitors, and their mechanical designs and methods of electrolyte injection for manufacturing.

3.0 BACKGROUND

Electrochemical energy storage devices, such as batteries and double layer capacitors, generally come in four form-factors: prismatic, pouch, button, and cylindrical cells. These devices or cells have an external metallic electrical contact for both positive and negative electrode to carry electrical current through a circuit. Often the cell housing will also feature a vent, burst disc, rupture disc, or another mechanism to relieve internal pressure building within the cell. The cell housing may also feature an injection port into which the electrolyte is injected to the interior of the cell which houses the positive and negative electrodes and separator.

Cylindrical cells do not have an injection port on the cap assembly since such a feature is unnecessary. In practice, the electrolyte is first injected into the cell as a first step, followed by a cap assembly being installed onto the cell as a second step.

But it is advantageous, particularly with a liquefied gas electrolyte, to have a cap assembly fixed onto the cell housing as a first step then inject electrolyte into the cell as a second step. To prevent immediate evaporation of the liquefied gas electrolyte would require the cap to be fixed in place as a first step, followed by electrolyte injection as a second step, and immediate sealing of the cell without releasing the pressure of the electrolyte to prevent electrolyte evaporation as a third step.

What is needed is a cell design that simplifies the process in a cost effective manner. Presented herein is a cap assembly with an electrolyte injection port, a vent, and a metallic electrical contact surface. The cap assembly may be installed on the cell can prior to electrolyte gas injection, simplifying the manufacturing process. Moreover, these features (i.e., electrolyte injection port, a vent, and a metallic electrical contact surface) may have a relatively circular geometry as well to which a geometric center and geometric diameter may be measured and is referenced through this invention. Even more beneficial from the standpoint of the mass and volume of the cap assembly would be to have all three of these cap assembly feature centers concentric to minimize footprint of the cap while maintaining high capability and functionality of the device. This concentric configuration will also minimize volume, mass, and cost of the cap assembly.

4.0 SUMMARY

A cap assembly is disclosed herein that creates a gas-tight seal with a cell can housing. The cap assembly has an outer surface, an inner surface and a perimeter edge. The cap assembly further includes an electrolyte injection port forming a port opening between the outer surface and the inner surface, a vent constructed to form a vent opening from the inner surface to the outer surface when a vent pressure differential is achieved between an outer surface pressure and an inner surface pressure. The vent is positioned (a) concentric to the electrolyte injection port, and (b) closer to the perimeter edge than the position of the electrolyte injection port.

The perimeter edge may be circular, or near-circular. The vent may substantially circumscribe the electrolyte injection port, and may further comprise a double vent notch.

The cell can housing may contain two electrodes and the cap assembly may have an electrical contact surface constructed to provide electrical communication from the outer surface to one of the electrodes. The electrical contact surface may be positioned (a) concentric to the electrolyte injection port, and (b) closer to the perimeter edge than the position of the electrolyte injection port. The electrical contact surface may substantially circumscribe the electrolyte injection port. An electrical insulator may electrically isolate the electrical contact surface from the perimeter edge.

The cap assembly may have a weld joint adapted to connect the cell can housing to the perimeter edge. The perimeter edge may have a shoulder adapted to contact the cell can housing along two surfaces that are perpendicular to each other.

The injection port may be sealed by a set screw, an expansion plug, a metal plug or a welded plug. The injection port may also have a metal tube extending away from the outer surface that may be used for filling the cell can housing with an electrolyte.

The perimeter edge may be part of a cap lid. A ring may compress a rubber gasket against the cap lid. The ring may be a shrink fit ring or a press fit ring, and the rubber gasket may provide electrical insulation.

The electrolyte injection port may have a valve to allow for filling the cell can housing with an electrolyte.

One non-limiting example is an electrolyte injection port with a poppet, a compression spring connected to the poppet and a seat. Electrolyte injection port may have two configurations: an open configuration characterized by the poppet compressing the spring and dislodging from the seat, forming the port opening between the outer surface and the inner surface; and a sealed configuration characterized by uncompressing the spring relative to the open configuration, forcing the poppet to mate with the seat, forming a gas-tight seal that seals the port opening shut. The open configuration may be actuated by a force applied to the poppet. The poppet may also have a wedge stopper that restricts the movement of the poppet.

A second non-limiting example is an electrolyte injection port with a ball, a compression spring connected to the ball, and a seat. The electrolyte injection port may have two configurations: an open configuration characterized by the ball compressing the compression spring and dislodging from the seat to form the port opening between the outer surface and the inner surface; and a sealed configuration characterized by uncompressing the compression spring relative to the open configuration, forcing the ball to mate with the seat, forming a gas-tight seal that seals the port opening shut. The open configuration may be actuated by an injection pressure applied to the ball from the outer surface that is at least greater than a cell can pressure applied to the ball from the inner surface. A cage may be used to restrict the movement of the ball.

A third non-limiting example is an electrolyte injection port with a conical plug and a rubber seat. The electrolyte injection port may have two configurations: an open configuration characterized by the conical plug dislodging from the rubber seat to form the port opening between the outer surface and the inner surface; and a sealed configuration characterized by the conical plug mating with the rubber seat, forming a gas-tight seal that seals the port opening shut. The open configuration may be actuated by an injection pressure applied to the conical plug from the outer surface that is at least greater than a cell can pressure applied to the conical plug from the inner surface.

A fourth non-limiting example is an electrolyte injection port with a rubber plug, a spring tab in contact with the rubber plug and a seat. The electrolyte injection port may have two configurations: an open configuration characterized by the by the rubber plug extending the spring tab and dislodging from the seat to form the port opening between the outer surface and the inner surface; and a sealed configuration characterized by the rubber plug mating with the seat, forming a gas-tight seal that seals the port opening shut. The open configuration may be actuated by an injection pressure applied to the rubber plug from the outer surface that is at least greater than a cell can pressure applied to the rubber plug from the inner surface.

In each of the foregoing non-limiting examples, the injection port may be used to inject a pressurize electrolyte (or solvent) into the cell can housing, and the port will automatically seal when the injection process is concluded to prevent escape of the pressured electrolyte (or solvent).

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 4A is a cross-sectional view of a cap assembly with a poppet-type valve in the sealed configuration.

FIG. 4B is a cross-sectional view of a cap assembly with a poppet-type valve in the open configuration.

6.0 DETAILED DESCRIPTION

Figure 1:
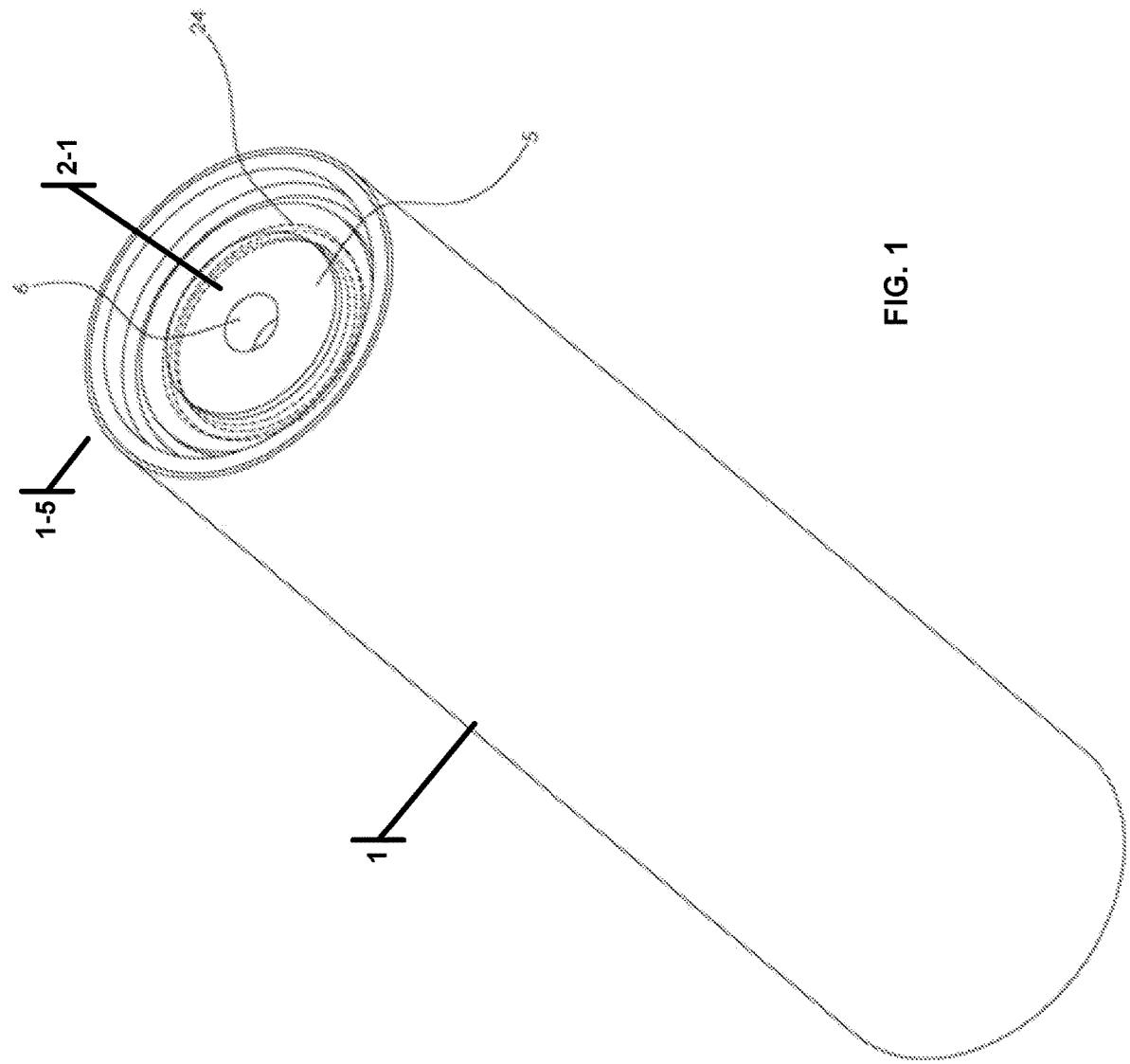
FIG. 1 illustrates a cell can housing connected to a cap assembly.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

1 Cell Can Housing
1-5 Cap Assembly
2 Cap Lid
2-1 Outer Surface
2-2 Inner Surface
2-3 Perimeter Edge
3 Rubber Gasket
4 Electrical Insulator
5 Metallic Electrical Contact Surface
6 Electrolyte Injection Port
6-1 Port Opening
7 Poppet
7-1 Portion Extending from the Outer Surface
7-2—Poppet Force
7-3 Poppet Seat
7-4 Compression Spring Force
7-5 Cell Can (Internal Gas) Pressure
8 Wedge Stopper
9 Compression Spring
10 Metal Tube
11 Rubber Ball
11-1 Ball Seat
11-2 Injection Pressure
11-3 Cell Can (Internal Gas) Pressure
11-4 Compression Spring Force
12 Compression Spring
13 Cage
14 Welded Plug
15 Conical Plug
15-1 Injection Pressure
15-2 Cell Can Pressure
16 Rubber 0-Ring Seat
18 Set Screw
19 Rubber Plug
20 Spring Tab
21 Rubber Plug
21-1 Rubber Plug Seat
21-2 Injection Pressure
21-3 Cell Can (Internal Gas) Pressure
21-4 Spring Tab Force
22 Expansion Plug
23 Weld Joint
24 Single Vent Notch
24-1 Vent Opening
25 Metal Plug
26 Double Vent Notch
27 Washer
28 Shrink Fit or Press Fit Ring
29 Shoulder
29-1 First Shoulder Surface
29-2 Second Shoulder Surface Current state of the art cylindrical cells do not have an injection port on the cap assembly since in general the electrolyte injection into the cell is first completed as a first step and then followed by cap assembly being installed onto the cell as a second step. It would be beneficial to have a cap assembly already fixed onto a cell housing as a first step then inject electrolyte into the cell as a second step, particularly in the case of a liquefied gas electrolyte. To prevent immediate evaporation of the liquefied gas electrolyte would require the cap to be fixed in place as a first step, followed by electrolyte injection as a second step, and immediate sealing of the cell without releasing the pressure of the electrolyte to prevent electrolyte evaporation as a third step.

Figure 2:
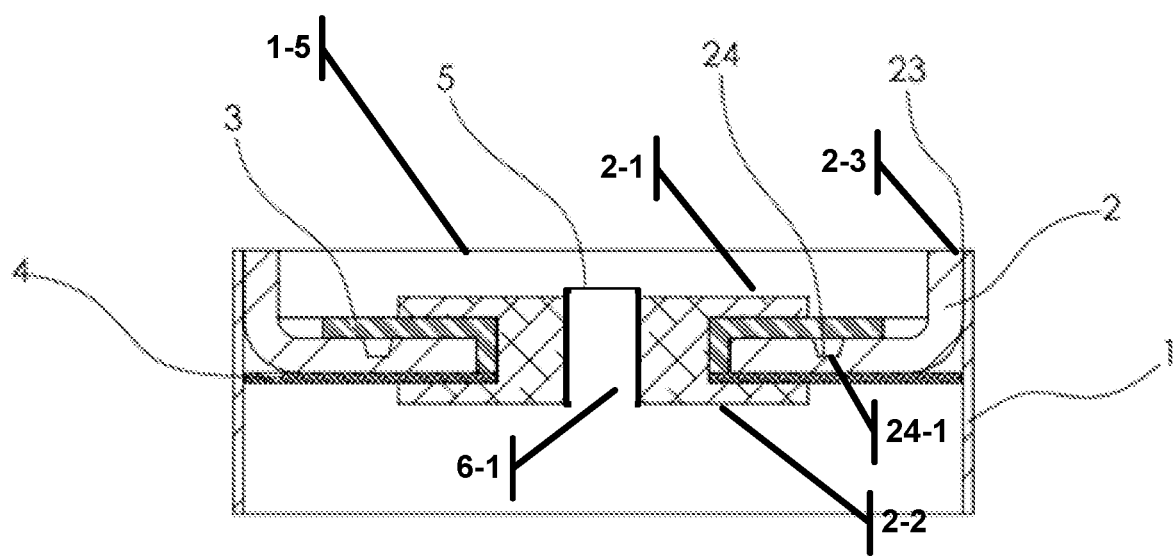
FIG. 2 is a cross-sectional view of a cap assembly.

It would be further beneficial for manufacturing and cost to have the electrolyte injection port, the vent, and the metallic electrical contact surface all on the same cap assembly. These features may have a relatively circular geometry as well to which a geometric center and geometric diameter may be measured and is referenced through this invention. Even more beneficial from the standpoint of the mass and volume of the cap assembly would be to have all three of these cap assembly feature centers (the electrolyte injection port, the vent, and the metallic electrical contact surface) concentric to minimize footprint of the cap while maintaining high capability and functionality of the device. This type of concentric configuration will minimize volume, mass, and cost of the cap assembly as well as simplify manufacturing Referencing FIGS. 1-3, a novel cap assembly 1-5 is shown that creates a gas-tight seal with a cell can housing 1. The cap assembly 1-5 has an outer surface 2-1, an inner surface 2-2 and a perimeter edge 2-3. An electrolyte or solvent may be introduced into the electrochemical energy storage device by injecting it through the electrolyte injection port 6. The electrolyte injection port 6 forming a port opening 6-1 between the outer surface 2-1 and the inner surface 2-2. The cap assembly 1-5 also has a vent 24 constructed to form a vent opening 24-1 from the inner surface 2-2 to the outer surface 2-1 when a vent pressure differential is achieved or surpassed between an outer surface pressure and an inner surface pressure. The vent 24 may be a weakened portion of the lid 2 and designed to open under high internal cell pressure. This weakened portion of the lid 2 may be formed by a notch in the lid 2, which is a thinner portion of the lid 2 thus providing a weakened location from which venting of the cell can occur under high internal cell pressure. The vent 24 is positioned (a) concentric to the electrolyte injection port 6, and (b) closer to the perimeter edge 2-3 than the position of the electrolyte injection port 6.

Figure 3:
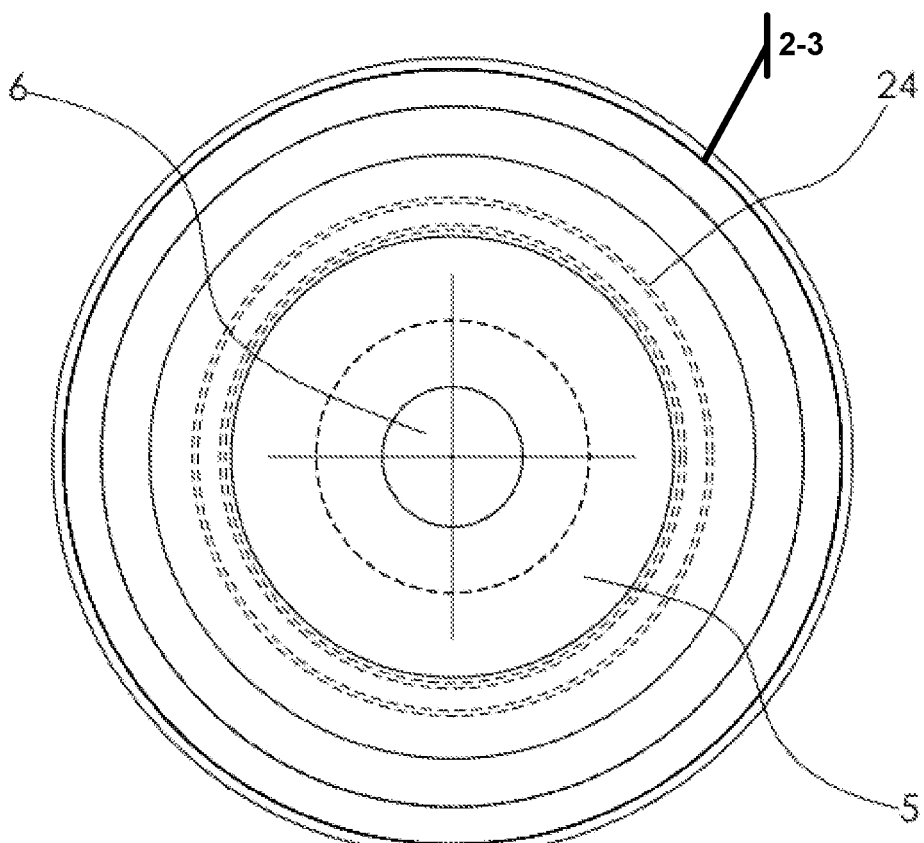
FIG. 3 is a top view of a cap assembly.

The cap assembly 1-5 may be connected to a cell housing 1 via weld-joint 23. The cell housing 1 may also be circular in geometry, and may be concentric or nearly concentric with the cap assembly features such as the electrolyte injection port 6, the vent 24, and the metallic electrical contact surface 5. The finished electro-chemical energy storage device may contain two electrodes housed by the cell housing 1. The cap 1-5 assembly may have an electrical contact surface 5 constructed to provide electrical communication from the outer surface 2-1 to at least one of the electrodes. The electrical contact surface 5 may be positioned (a) concentric to the electrolyte injection port 6, and (b) closer to the perimeter edge 2-3 than the position of the electrolyte injection port 6, as shown in FIG. 3. An electrical insulator 4 may electrically isolate the electrical contact surface 5 from the lid 2 and its perimeter edge 2-3.

As shown in FIG. 3, the perimeter edge 2-3 may be circular, or near-circular. The vent 24 may substantially circumscribe the electrolyte injection port 6, and may further comprise a double vent notch. Likewise, the electrical contact surface 5 may substantially circumscribe the electrolyte injection port 6.

The cap assembly features (i.e., the electrolyte injection port 6, the electrical contact surface 5, and the vent 24) need not be exactly concentric, but can be configured to be nearly concentric, such as having the diameter of feature 1 inside the diameter of the feature 2, and the diameter of feature 2 inside the diameter of feature 3. For example, the electrolyte injection port 6 may have outer diameter A, the metallic electrical contact surface 5 may have outer diameter B, and the vent 24 may have outer diameter C, whereas the dimensions of A, B, and C are such that A<B<C.

While the cap assembly 1-5 features are preferably circular for ease of machining and assembly, the cap assembly features—i.e., the electrolyte injection port 6, the vent 24, and the metallic electrical contact surface 5—may be various shapes. Nearly concentric features may also be defined as having the entirety of one feature being located within the outer geometry of the next larger feature.

FIGS. 4A-4B illustrate a cap assembly 1-5 with a poppet-type valve, advantageously allowing the injection of a pressurize electrolyte (or solvent) into the cell can housing 1 with the port 6 automatically sealing when the injection process is concluded to prevent escape of the pressured electrolyte (or solvent). Specifically, the poppet-type valve includes a poppet 7, a compression spring 9 connected to the poppet 7 and a seat 7-3. The electrolyte injection port 6 therefore may have two configurations: an open configuration (FIG. 4B) characterized by the poppet 7 compressing the spring 9 and dislodging the poppet 7 from the seat 7-3, forming the port opening 6-1 between the outer surface 2-1 and the inner surface 2-2; and a sealed configuration (FIG. 4A) characterized by uncompressing the spring 9 relative to the open configuration, forcing the poppet 7 to mate with the seat 7-3, forming a gas-tight seal that seals the port opening 6-1 shut. The open configuration may be actuated by a force 7-2 applied to the poppet 7. As shown, the poppet may have a portion 7-1 extending from the outer surface 2-1. The poppet 7 may also have a wedge stopper 8 that restricts the movement of the poppet 7. The force 7-2 may be a mechanical force imposed by a structure, similar to the valve structure on a bicycle pump. Alternatively, or in conjunction with the mechanical force, the force 7-2 may be a pressure force imposed by the pressurized gas. The poppet 7 will dislodge from the seat 7-3 with the force 7-2 that is greater than the force imposed by the compression spring 7-4 and the pressure force 7-5 from the gases acting on the poppet 7 from the inner surface 2-3.

Figure 5:
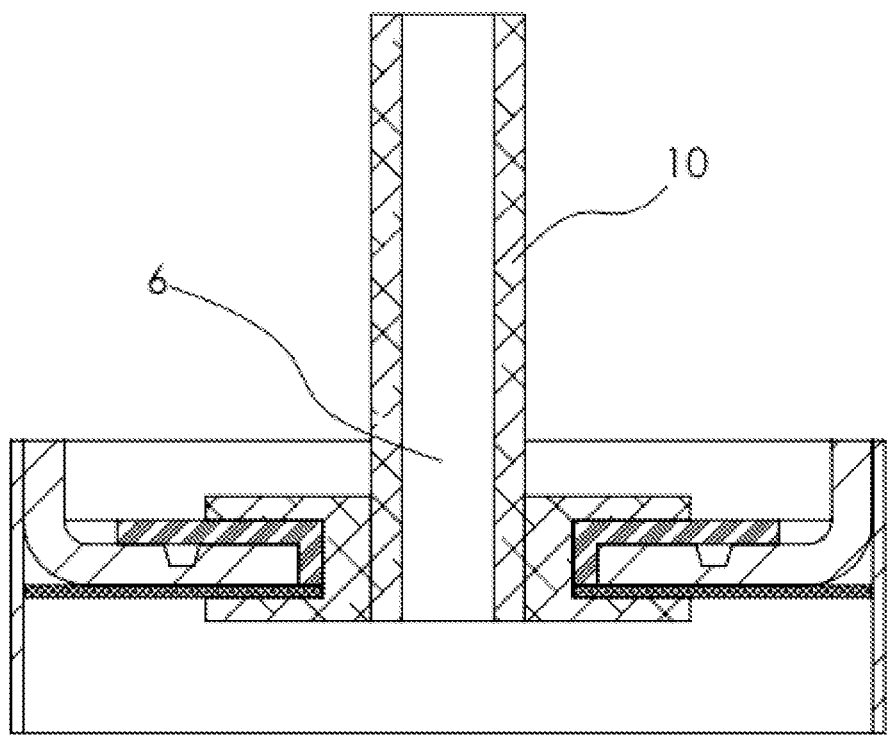
FIG. 5 is a cross-sectional view of a cap assembly with a metal tube in the electrolyte injection port.

FIG. 5 illustrates the electrolyte injection port 6 with a metal tube 10 that may be used to facilitate introduction of the electrolyte (or solvent) into the cell.

Figure 6A:
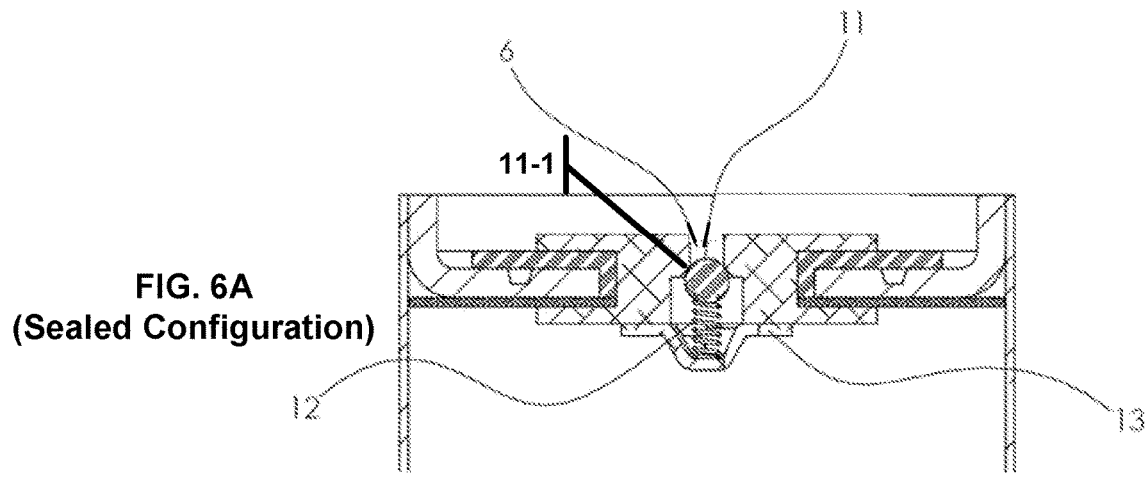
FIG. 6A is a cross-sectional view of a cap assembly with a ball-type valve in the sealed configuration.
Figure 6B:
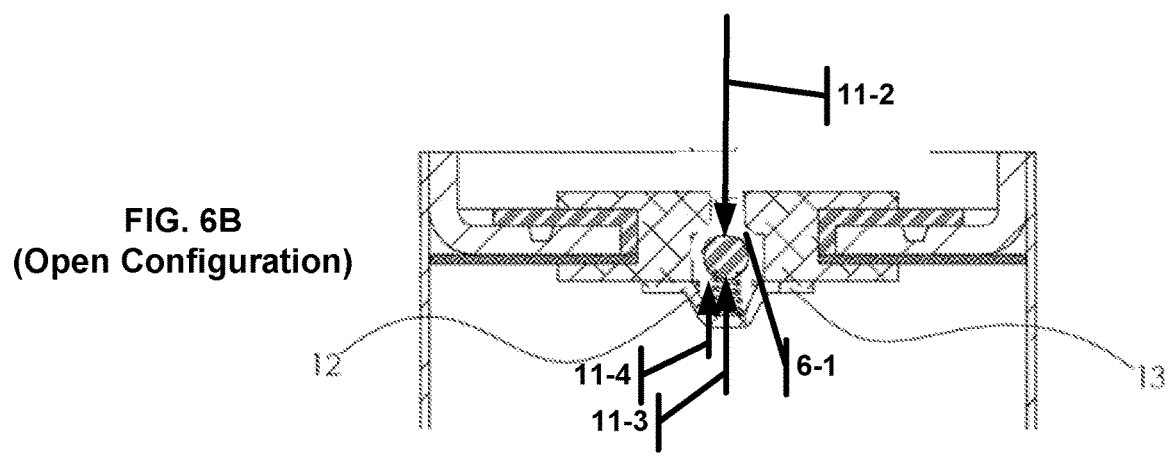
FIG. 6B is a cross-sectional view of a cap assembly with a ball-type valve in the open configuration.

FIGS. 6A-6B illustrate a cap assembly 1-5 with a ball-type valve, advantageously allowing the injection of a pressurize electrolyte (or solvent) into the cell can housing 1 with the port 6 automatically sealing when the injection process is concluded to prevent escape of the pressured electrolyte (or solvent). Specifically, the ball-type valve includes a ball 11, a compression spring 12 connected to the ball 11, and a seat 11-1. The electrolyte injection port 6 therefore may have two configurations: an open configuration (FIG. 6B) characterized by the ball 11 compressing the compression spring 12 and dislodging the ball 11 from the seat 11-1 to form the port opening 6-1 between the outer surface 2-1 and the inner surface 2-2; and a sealed configuration (FIG. 6A) characterized by uncompressing the compression spring 12 relative to the open configuration, forcing the ball 11 to mate with the seat 11-1, forming a gas-tight seal that seals the port opening 6-1 shut. The open configuration may be actuated by an injection pressure 15-1 applied to the ball from the outer surface 2-1 that is at least greater than a cell can (internal gas) pressure 15-2 applied to the ball 11 from the inner surface 2-2. The injection pressure 15-1 must be larger than the cell can (internal gas) pressure 15-2 because it must also overcome the compression spring force 11-4. A cage 13 may be used to restrict the movement of the ball 11. The ball 11 may be made of rubber or other malleable material to form a tight seal with the seat 11-1.

Figure 6C:
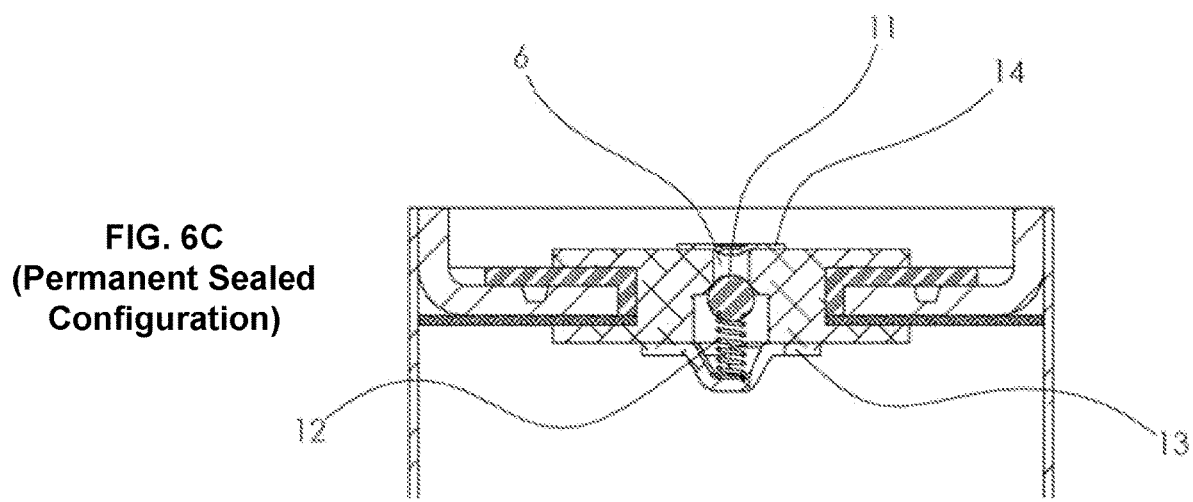
FIG. 6C is a cross-sectional view of a cap assembly with a ball-type valve in the permanent sealed configuration.

FIG. 6C shows the ball-type valve cap assembly with a welded plug 14 to permanently seal the electrolyte injection port 6.

Figure 7A:
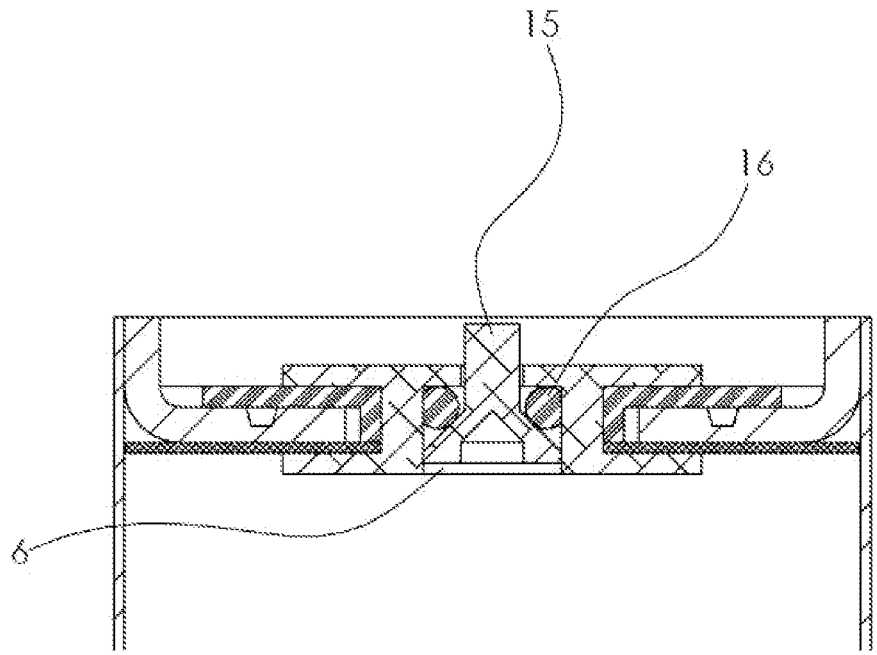
FIG. 7A is a cross-sectional view of a cap assembly with a conical plug-type valve in the sealed configuration.
Figure 7B:
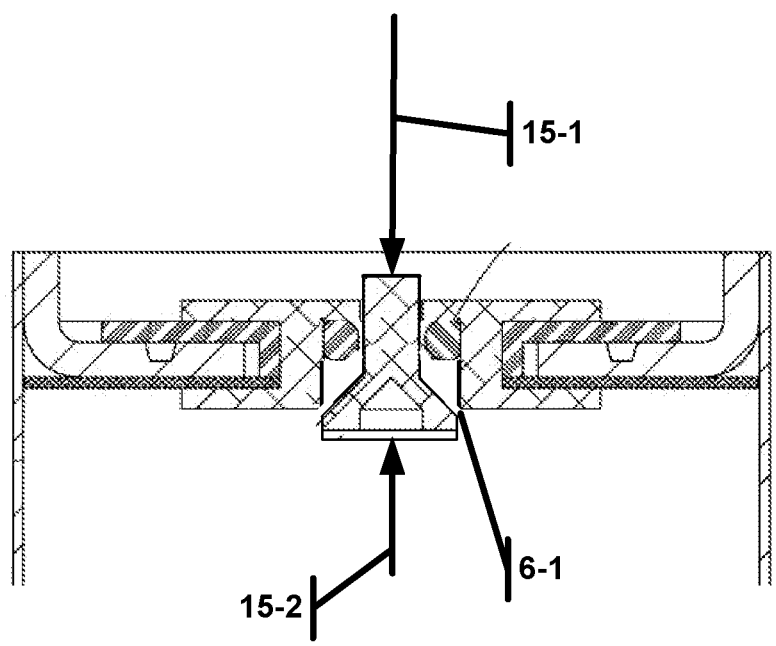
FIG. 7B is a cross-sectional view of a cap assembly with a conical plug-type valve in the open configuration.

FIGS. 7A-7B illustrate a cap assembly 1-5 with a conical plug-type valve, advantageously allowing the injection of a pressurize electrolyte (or solvent) into the cell can housing 1 with the port 6 automatically sealing when the injection process is concluded to prevent escape of the pressured electrolyte (or solvent). Specifically, the conical plug-type valve includes a conical plug 15 and a rubber seat 16. The electrolyte injection port 6 therefore may have two configurations: an open configuration (FIG. 7B) characterized by the conical plug 15 dislodging from the rubber seat 16 to form the port opening 6-1 between the outer surface 2-1 and the inner surface 2-2; and a sealed configuration (FIG. 7A) characterized by the conical plug 15 mating with the rubber seat 16, forming a gas-tight seal that seals the port opening 6-1 shut. The open configuration may be actuated by an injection pressure 15-1 applied to the conical plug 15 from the outer surface 2-1 that is at least greater than a cell can (internal gas) pressure 15-2 applied to the conical plug 15 from the inner surface 2-2.

Figure 8:
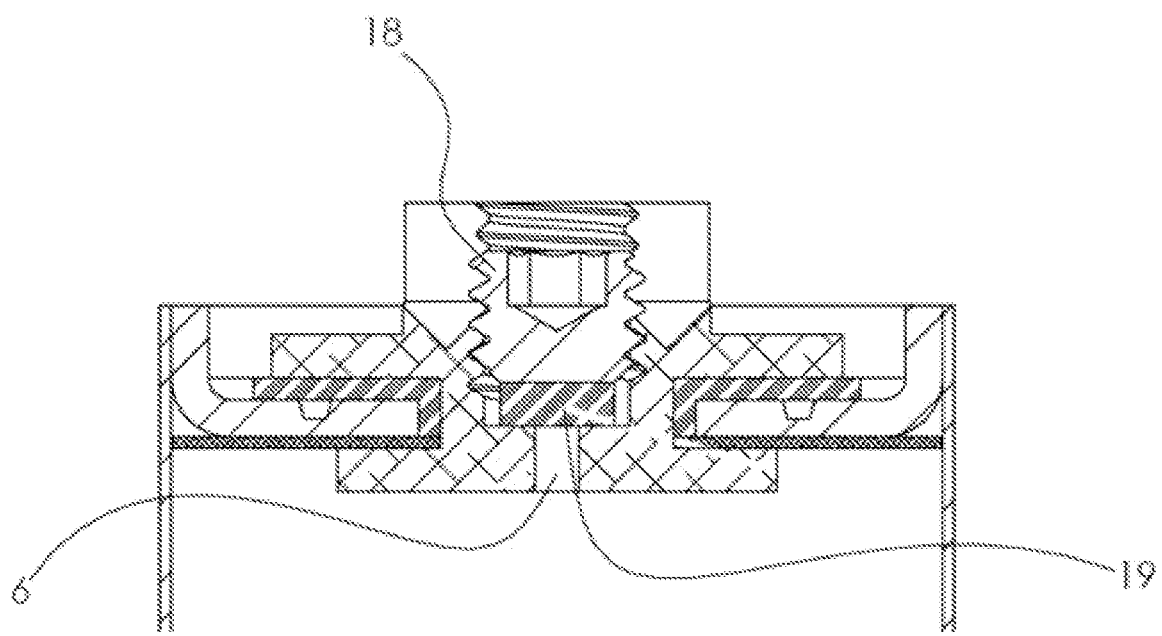
FIG. 8 is a cross-sectional view of a cap assembly with a set screw installed plugging the electrolyte injection port.
Figure 10:
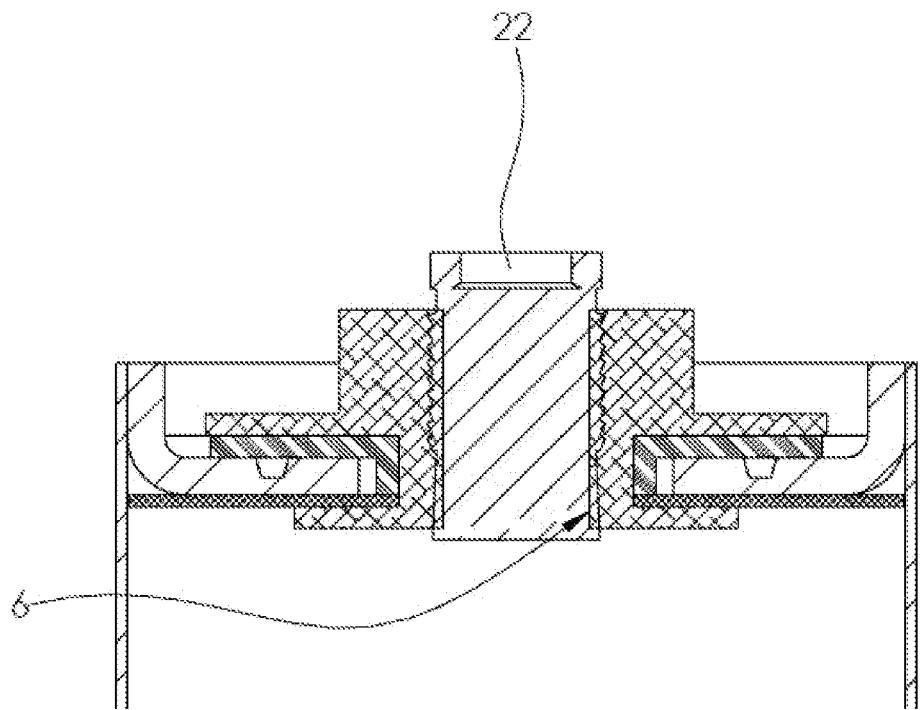
FIG. 10 is a cross-sectional view of a cap assembly with an expansion plug installed plugging the electrolyte injection port.
Figure 11:
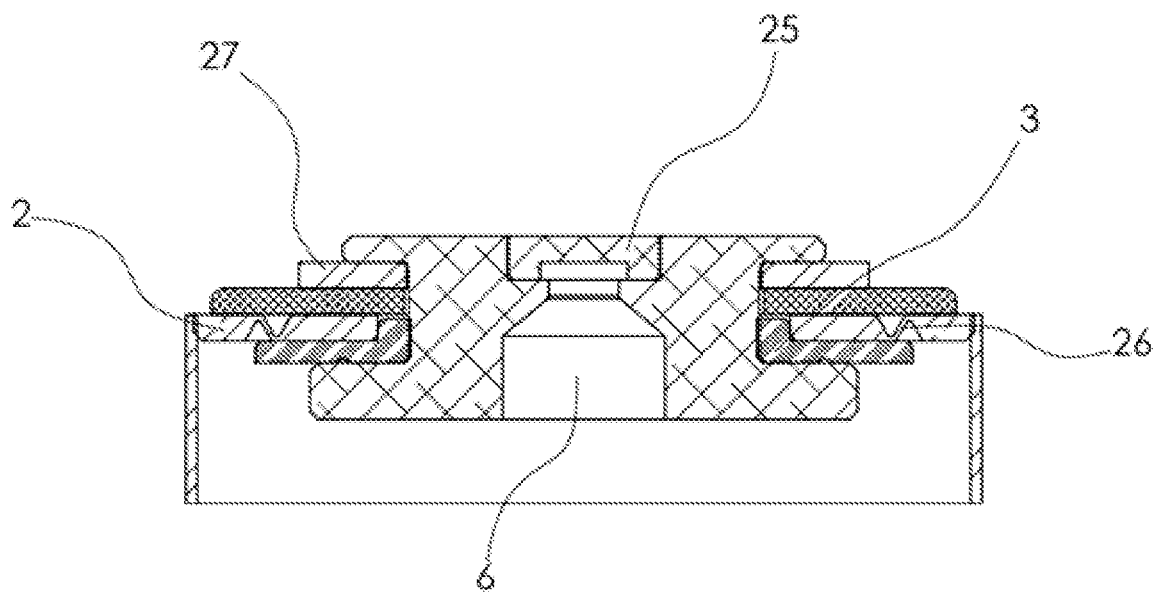
FIG. 11 is a cross-sectional view of a cap assembly with a metal plug installed plugging the electrolyte injection port.

FIGS. 8, 10 and 11 illustrate the electrolyte injection port 6 sealed by a set screw 18 (FIG. 8), a rubber plug 19 (FIG. 8), an expansion plug 22 (FIG. 10), and a metal plug 25 (FIG. 11).

Figure 9A:
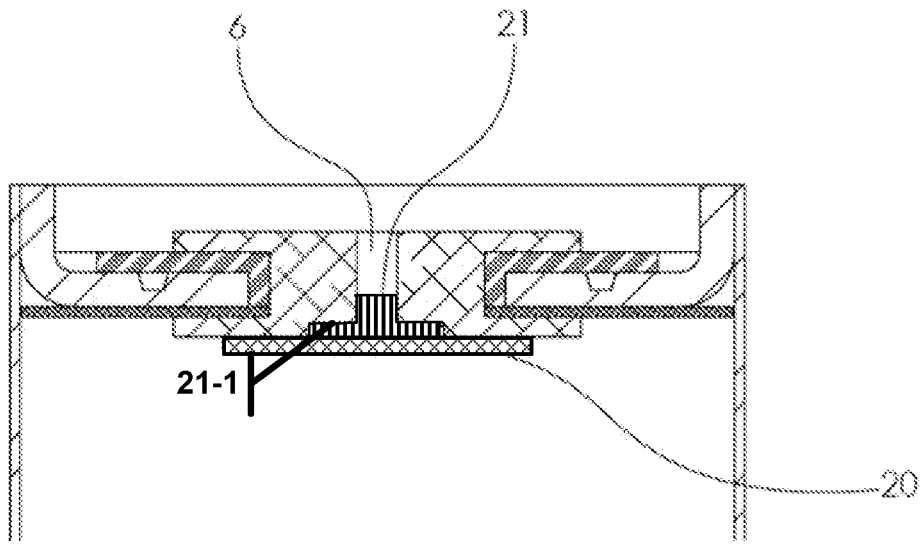
FIG. 9A is a cross-sectional view of a cap assembly with a rubber plug-type valve in the sealed configuration.
Figure 9B:
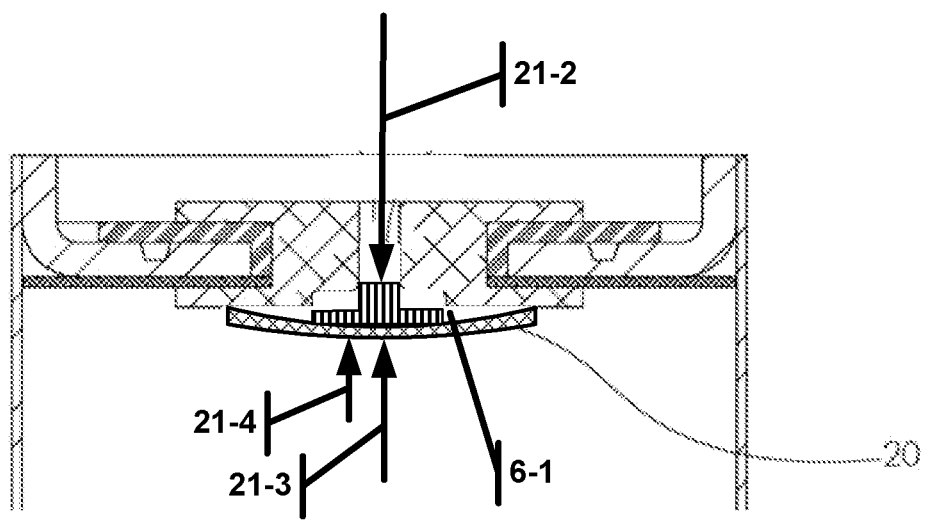
FIG. 9B is a cross-sectional view of a cap assembly with a rubber plug-type valve in the open configuration.

FIGS. 9A-9B illustrate a cap assembly 1-5 with a rubber plug-type valve, advantageously allowing the injection of a pressurize electrolyte (or solvent) into the cell can housing 1 with the port 6 automatically sealing when the injection process is concluded to prevent escape of the pressured electrolyte (or solvent). Specifically, the rubber plug-type valve includes a rubber plug 21, a spring tab 20 in contact with the rubber plug 21 and a seat 21-1. The electrolyte injection port 6 therefore may have two configurations: an open configuration (FIG. 9B) characterized by the rubber plug 21 extending the spring tab 20 and dislodging the rubber plug 21 from the seat 21-1 to form the port opening 6-1 between the outer surface 2-1 and the inner surface 2-2; and a sealed configuration (FIG. 9A) characterized by the rubber plug 21 mating with the seat 21-1, forming a gas-tight seal that seals the port opening 6-1 shut. The open configuration may be actuated by an injection pressure 21-2 applied to the rubber plug 21 from the outer surface 2-1 that is at least greater than a cell can (internal gas) pressure 21-3 applied to the rubber plug 21 from the inner surface 2-2. The injection pressure 21-2 must be larger than the cell can (internal gas) pressure 21-3 because it must also overcome the tab spring force 21-4.

Figure 12:
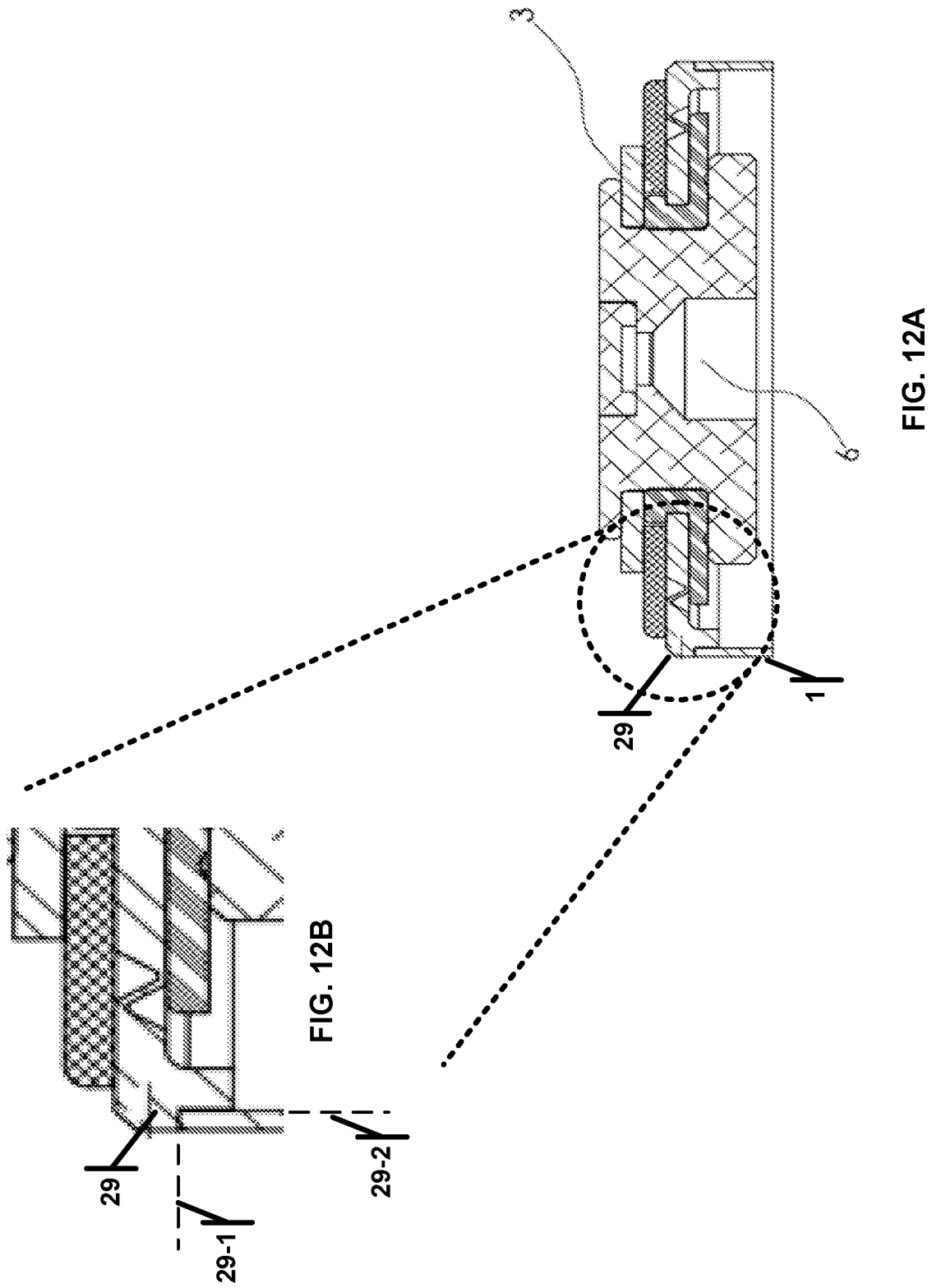
FIG. 12A is a cross-sectional view of a cap assembly in which the cell cap lid has a shoulder to rest on the cell housing can.
FIG. 12B is an enlarged view of the shoulder of FIG. 12A.
Figure 13:
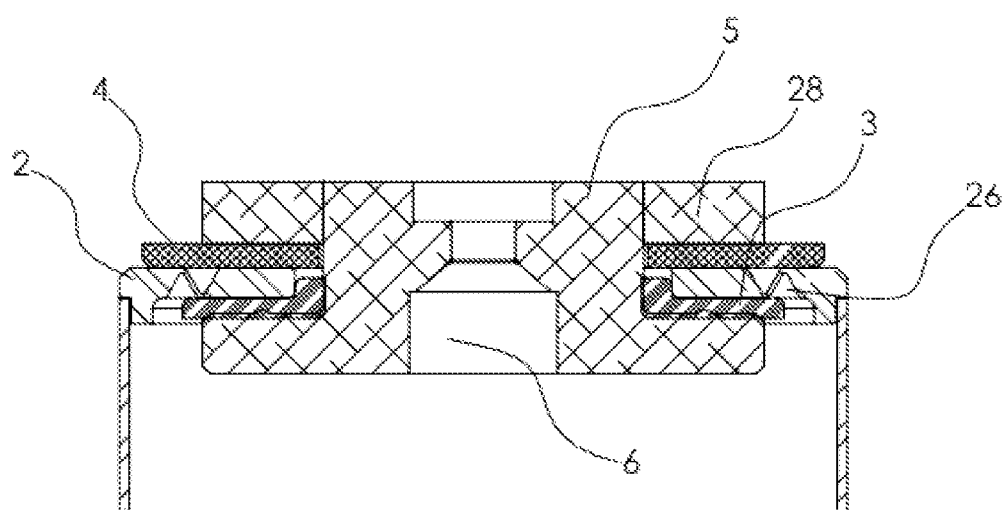
FIG. 13 is a cross-sectional view of a cap assembly that is held together by a shrink fit or interference fit ring which locks onto the metallic electrical contact surface.

FIGS. 12A and 12B illustrate a cap assembly with a shoulder 29 along the perimeter edge 2-3. The shoulder 29 is adapted to contact the cell can housing 1 along two surfaces (29-1 and 29-2) that are perpendicular to each other. These two surfaces ensure a strong and leak-proof connection between the cap assembly 1-5 and the cell can housing 1 which may be welded together FIG. 13 features a shrink fit or interference fit ring 28 which locks onto the metallic electrical contact surface 5. This is assembled in a manner in which the ring 28 will force compression on the rubber gasket 3 to create a seal to prevent electrolyte leakage from within the cell can housing 1 and act as an electrical insulator. The shrink fit or interference fit ring 28 may also be concentric or nearly concentric with the cap assembly features such as the electrolyte injection port 6, the vent 24, and the metallic electrical contact surface 5.

The previously describe cap assembly 1-5 may be used to more efficiently manufacture an electrochemical energy storage device. The cell can housing 1 may be fitting with a positive and negative electrode and a separator. The cell can housing 1 may further optionally include one or more salts and one or more additives. The cap assembly 1-5 can then be sealed onto the cell can housing 1. A pressurized liquefied gas solvent may be injected into the interior of the cell can housing 1 through the electrolyte injection port 6. Alternatively, a pressurized electrolyte may be pre-mixed with salt and one or more additives and injected into the interior of the cell can housing 1 through the electrolyte injection port 6. Once the electrolyte injection is complete, the cell is disconnected from the injection port 6, and the cap assembly 1-5 automatically seals, preventing gas leakage.

The finished electrochemical energy storage device can feature a liquefied gas electrolyte comprised of one or more salts, additives, or solvents wherein one or more of the solvents is a liquefied gas solvent which has a vapor pressure above an atmospheric pressure of 100 kPa at a temperature of 293.15 K. The liquefied gas solvent may comprise of one or more of fluoromethane, difluoromethane, trifluoromethane, fluoroethane, difluoroethane, trifluoroethane, tetrafluoroethane, pentafluoroethane, fluoroethylene, difluoroethylene, trifluoroethylene, tetrafluoroethylene, chloromethane, chloroethane, chloroethene, methane, ethane, propane, n-butane, iso-butane, pentane, hexane, heptane, octane, cyclopropoane, cyclobutane, cyclopentane, cyclohexane, cycloheptane, cyclooctane, ethene, propene, butene, pentene, heptane, octene, isomers thereof, saturated halogenated hydrocarbon, unsaturated halogenated hydrocarbon and isomers thereof Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made without departing from the scope and spirit of this invention, based on what is described and illustrated in this patent document While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A cap assembly (1-5) constructed to seal a cell can housing (1) having two electrodes, the cap assembly (1-5) comprises:
   an outer surface (2-1), an inner surface (2-2) and a perimeter edge (2-3);
   an electrolyte injection port (6) forming a port opening (6-1) between the outer surface (2-1) and the inner surface (2-2);
   a vent (24) constructed to form a vent opening (24-1) from the inner surface (2-2) to the outer surface (2-1) when a vent pressure differential is achieved between an outer surface pressure and an inner surface pressure;
   an electrical insulator (4, 3);
   wherein
   the vent (24) is positioned (a) concentric to the electrolyte injection port (6), and (b) closer to the perimeter edge (2-3) than the position of the electrolyte injection port (6); and
   the electrical insulator (4,3) is constructed to electrically isolate the vent (24) from the electrolyte injection port (6).

2. The cap assembly of claim 1, wherein the perimeter edge (2-3) is circular.

3. The cap assembly of claim 1, wherein the vent (24) circumscribes the electrolyte injection port (6).

4. The cap assembly of claim 1, wherein the vent (24) comprises a notch or a double notch.

5. The cap assembly of claim 1, comprises:
   an electrical contact surface (5) constructed to provide electrical communication from the outer surface (2-1) to one of the electrodes;
   wherein the electrical contact surface (5) is positioned (a) concentric to the electrolyte injection port (6), and (b) closer to the perimeter edge (2-3) than the position of the electrolyte injection port (6).

6. The cap assembly of claim 5, wherein the electrical contact surface (5) circumscribes the electrolyte injection port (6).

7. The cap assembly of claim 5, wherein the vent (24) is positioned closer to the perimeter edge (2-3) than the electrical contact surface (5).

8. The cap assembly of claim 6, wherein the electrical insulator (4,3) is constructed to electrically isolate the electrical contact surface (5) from the perimeter edge (2-3).

9. The cap assembly of claim 8, wherein the electrical insulator (4) comprises a rubber gasket (3).

10. The cap assembly of claim 1, further comprising a weld joint (23) adapted to connect the cell can housing (1) to the perimeter edge (2-3).

11. The cap assembly of claim 1, wherein the perimeter edge (2-3) comprises a shoulder (29) adapted to contact the cell can housing (1) along two surfaces (29-1, 29-2) that are perpendicular to each other.

12. The cap assembly of claim 1, wherein the injection port (6) is sealed by a set screw (18), an expansion plug (22), a metal plug (25) or a welded plug (14).

13. The cap assembly of claim 1, wherein the electrolyte injection port (6) comprises a metal tube (10) extending away from the outer surface (2-1).

14. The cap assembly of claim 1, further comprising:
a cap lid (2) that comprises the perimeter edge (2-3);
a rubber gasket (3); and
a ring (28);
wherein the ring (28) compresses the rubber gasket (3) against the cap lid (2); and
wherein the ring (28) is a shrink fit ring or a press fit ring.

15. The cap assembly of claim 1, wherein the electrolyte injection port (6) comprises a valve constructed (a) to form the port opening (6-1) when a pressure is applied to the valve from the outer surface (2-1); and (b) to close the port opening (6-1), forming a gas-tight seal when the pressure from the outer surface (2-1) is removed.

16. The cap assembly of claim 1, wherein the electrolyte injection port comprises:
a poppet (7) with a portion (7-1) extending away from the outer surface (2-1), a compression spring (9) connected to the poppet (7), and a seat (7-3);
wherein the electrolyte injection port (6) comprises two configurations:
an open configuration characterized by the poppet (7) compressing the spring (9) and dislodging from the seat (7-3), forming the port opening (6-1) between the outer surface (2-1) and the inner surface (2-2); and
a sealed configuration characterized by uncompressing the spring (9) relative to the open configuration, forcing the poppet (7) to mate with the seat (7-3), forming a gas-tight seal that seals the port opening (6-1) shut;
wherein the open configuration is actuated by a force (7-2) applied to the portion of the poppet (7-1).

17. The cap assembly of claim 16, wherein the poppet (7) comprises a wedge stopper (8) constructed to restrict the movement of the poppet (7).

18. The cap assembly of claim 1, wherein the electrolyte injection port (6) comprises:
a ball (11), a compression spring (12) connected to the ball (11), and a seat (11-1);
where the electrolyte injection port (6) comprises two configurations:
an open configuration characterized by the ball (11) compressing the compression spring (12) and dislodging from the seat (11-1) to form the port opening (6-1) between the outer surface (2-1) and the inner surface (2-2); and
a sealed configuration characterized by uncompressing the compression spring (12) relative to the open configuration, forcing the ball (11) to mate with the seat (11-1), forming a gas-tight seal that seals the port opening (6-1) shut;
wherein the open configuration is actuated by an injection pressure (11-2) applied to the ball (11) from the outer surface (2-1) that is at least greater than a cell can pressure (11-3) applied to the ball (11) from the inner surface (2-2).

19. The cap assembly of claim 18, further comprising a cage (13) constructed to restrict the movement of the ball (11).

20. The cap assembly of claim 1, wherein the electrolyte injection port (6) comprises:
a conical plug (15) and a rubber seat (16);
wherein the electrolyte injection port (6) comprises two configurations:
an open configuration characterized by the conical plug (15) dislodging from the rubber seat (16) to form the port opening (6-1) between the outer surface (2-1) and the inner surface (2-2); and
a sealed configuration characterized by the conical plug (15) mating with the rubber seat (16), forming a gas-tight seal that seals the port opening (6-1) shut;
wherein the open configuration is actuated by an injection pressure (15-1) applied to the conical plug (16) from the outer surface (2-1) that is at least greater than a cell can pressure (15-2) applied to the conical plug (16) from the inner surface (2-2).

21. The cap assembly of claim 1, wherein the electrolyte injection port (6) comprises:
a rubber plug (21), a spring tab (20) in contact with the rubber plug (21) and a seat (21-1);
wherein the electrolyte injection port (6) comprises two configurations:
an open configuration characterized by the by the rubber plug (21) extending the spring tab (20) and dislodging from the seat (21-1) to form the port opening (6-1) between the outer surface (2-1) and the inner surface (2-2); and
a sealed configuration characterized by the rubber plug (21) mating with the seat (21-1), forming a gas-tight seal that seals the port opening (6-1) shut;
wherein the open configuration is actuated by an injection pressure (21-2) applied to the rubber plug (21) from the outer surface (2-1) that is at least greater than a cell can pressure (21-3) applied to the rubber plug (21) from the inner surface (2-2).

22. An electrochemical energy storage device comprising:
a cap assembly (1-5) comprising:
an outer surface (2-10), an inner surface (2-2) and a perimeter edge (2-3);
an electrolyte injection port (6) forming a port opening (6-1) between the outer surface (2-1) and the inner surface (2-2);
a vent (24) constructed to form a vent opening (24-1) from the inner surface (2-2) to the outer surface (2-1) when a vent pressure differential is achieved between an outer surface pressure and an inner surface pressure;
an electrical insulator (4, 3);
wherein:
the vent (24) is positioned (a) concentric to the electrolyte injection port (6), and (b) closer to the perimeter edge (2-3) than the position of the electrolyte injection port (6); and
the electrical insulator (4,3) is constructed to electrically isolate the vent (24) from the electrolyte injection port (6);
a cell can housing (1) comprising an electrolyte under pressure;
wherein the cap assembly (1-5) and cell can housing (1) forms a gas-tight seal preventing the escape of the electrolyte during normal operating conditions.

23. The electrochemical energy storage device of claim 22, wherein the electrolyte comprises a salt and a solvent, wherein the solvent is a liquefied gas with a vapor pressure above an atmospheric pressure of 100 kPa at a temperature of 293.15 K.

24. The electrochemical energy storage device of claim 23, wherein the solvent is selected from a group consistent of: fluoromethane, difluoromethane, trifluoromethane, fluoroethane, difluoroethane, trifluoroethane, tetrafluoroethane, pentafluoroethane, fluoroethylene, difluoroethylene, trifluoroethylene, tetrafluoroethylene, chloromethane, chloroethane, chloroethene, methane, ethane, propane, n-butane, isobutane, pentane, hexane, heptane, octane, cyclopropoane, cyclobutane, cyclopentane, cyclohexane, cycloheptane, cyclooctane, ethene, propene, butene, pentene, heptane, octene, isomers thereof, saturated halogenated hydrocarbon, unsaturated halogenated hydrocarbon and isomers thereof.

25. The electrochemical energy storage device of claim 24, wherein the electrochemical energy storage device is a battery or a capacitor.

* * * * *